(12) United States Patent
Cottarel et al.

(10) Patent No.: US 9,880,732 B2
(45) Date of Patent: Jan. 30, 2018

(54) METHOD FOR DETECTING AN ANGULAR VARIATION OF A CONTROL PATH ON A TOUCH SURFACE AND CORRESPONDING CONTROL MODULE

(75) Inventors: Bruno Cottarel, Annemasse (FR); Florent De Vaux Bidon, Annemasse (FR); Cedric Chartrain, Annemasse (FR)

(73) Assignee: DAV, Créteil (FR)

( * ) Notice: Subject to any disclaimer, the term of this patent is extended or adjusted under 35 U.S.C. 154(b) by 555 days.

(21) Appl. No.: 12/747,699

(22) PCT Filed: Dec. 19, 2008

(86) PCT No.: PCT/EP2008/068025
§ 371 (c)(1),
(2), (4) Date: Oct. 19, 2010

(87) PCT Pub. No.: WO2009/083497
PCT Pub. Date: Jul. 9, 2009

(65) Prior Publication Data
US 2011/0025618 A1    Feb. 3, 2011

(30) Foreign Application Priority Data
Dec. 20, 2007    (FR) ..................... 07 08910

(51) Int. Cl.
*G06F 3/041* (2006.01)
*G06F 3/045* (2006.01)
*G06F 3/0488* (2013.01)

(52) U.S. Cl.
CPC .......... *G06F 3/04883* (2013.01); *G06F 3/045* (2013.01); *G06F 3/0412* (2013.01); *G06F 3/0414* (2013.01); *G06F 3/0488* (2013.01)

(58) Field of Classification Search
CPC ........ G06F 3/41; G06F 3/0412; G06F 3/0414; G06F 3/045; G06F 3/0488; G06F 3/04883; G09G 5/00; G09G 5/08
(Continued)

(56) References Cited

U.S. PATENT DOCUMENTS 4,810,992 A * 3/1989 Eventoff ................. G06F 3/045
338/114
4,840,083 A   6/1989 Hagan et al.
(Continued)

FOREIGN PATENT DOCUMENTS

EP    0 541 102 A1    5/1993
FR    2 683 649 A1    5/1993
(Continued)

OTHER PUBLICATIONS

Office Action issued in corresponding Japanese Application No. 2010-538759 dated May 16, 2013, and English translation thereof (10 pages).
(Continued)

*Primary Examiner* — Michael J Eurice
(74) *Attorney, Agent, or Firm* — Osha Liang LLP

(57) ABSTRACT

The invention relates to a method for determining the elementary angle of a control path on a touch surface, characterized in that it comprises measuring two elementary movement values (|dX|, |dY|) along two perpendicular axes (X, Y) for a predetermined duration (dT), comparing said values (|dX|, |dY|) with unitary value ranges of elementary movements (Xu, Yu) of a reference data table and allocating a reference data representative of an angle to an elementary angle (dθ) of the control path. The invention also relates to a method for detecting an angular variation of a control path on a touch surface, characterized in that it comprises implementing the above method for determining the elementary (Continued)

Figure 1:
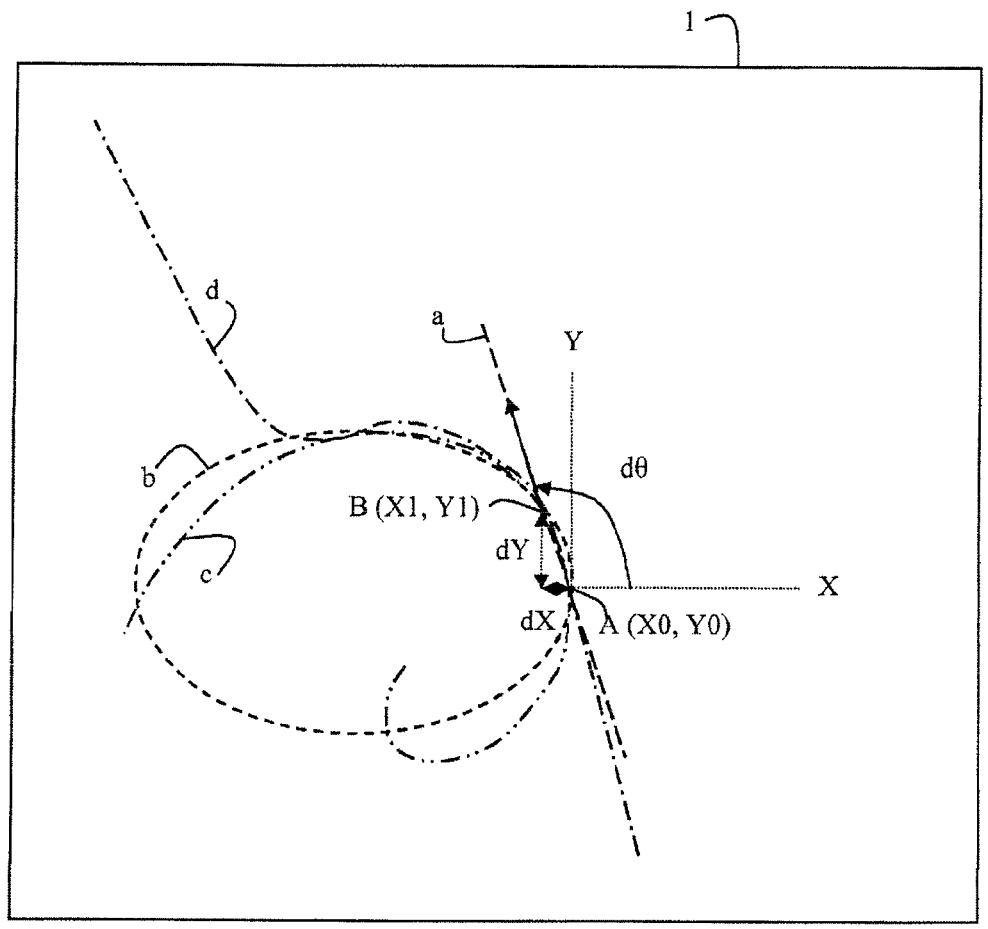

angle of a control path on a touch surface and storing the elementary angle (dθ) allocated during an elementary step, repeating the elementary step, and assembling in series the allocated elementary angles (dθ) in order to determine an angular variation of the control path. The invention further relates to a control module including a touch surface (1), characterized in that it comprises a processing unit for implementing the method for detecting an angular variation of a control path as described above.

18 Claims, 4 Drawing Sheets

(58) Field of Classification Search
USPC ........... 345/173, 684, 156, 163, 672; 341/20
See application file for complete search history.

(56) References Cited

U.S. PATENT DOCUMENTS

| | | | | |
|---|---|---|---|---|
| 5,008,497 A * | 4/1991 | Asher | G06F 3/045 178/18.05 |
| 5,404,152 A * | 4/1995 | Nagai | G06F 3/0362 345/157 |
| 5,453,761 A * | 9/1995 | Tanaka | G06F 3/0485 178/18.01 |
| 5,739,811 A * | 4/1998 | Rosenberg | A63F 13/06 345/161 |
| 5,861,874 A * | 1/1999 | Joto | G06F 3/0488 178/18.01 |
| 5,903,229 A * | 5/1999 | Kishi | G06F 3/04883 178/19.01 |
| 6,278,445 B1 * | 8/2001 | Tanaka | G06F 3/04883 345/177 |
| 6,285,351 B1 * | 9/2001 | Chang | G06F 3/011 345/156 |
| 6,298,566 B1 * | 10/2001 | Endo | G01B 7/004 33/1 PT |
| 7,446,754 B2 * | 11/2008 | Ausbeck, Jr. | 345/156 |
| 8,059,099 B2 * | 11/2011 | Lampell et al. | 345/173 |
| 2003/0068053 A1 * | 4/2003 | Chu | G06F 3/016 381/118 |
| 2003/0174149 A1 * | 9/2003 | Fujisaki | G06F 3/04883 345/684 |
| 2004/0021633 A1 | 2/2004 | Rajkowski | |
| 2004/0140956 A1 * | 7/2004 | Kushler | G06F 3/04883 345/168 |
| 2004/0212605 A1 * | 10/2004 | Fitzmaurice | G06F 3/0481 345/184 |
| 2005/0044450 A1 * | 2/2005 | Nakata | G06F 17/5009 714/33 |
| 2005/0168443 A1 * | 8/2005 | Ausbeck, Jr. | G06F 3/038 345/163 |
| 2005/0168489 A1 * | 8/2005 | Ausbeck, Jr. | G06F 3/0481 345/672 |
| 2006/0019752 A1 * | 1/2006 | Ohta | A63F 13/06 463/43 |
| 2006/0026521 A1 * | 2/2006 | Hotelling | G06F 3/0418 715/702 |
| 2006/0032680 A1 * | 2/2006 | Elias | G06F 3/044 178/18.06 |
| 2006/0082556 A1 * | 4/2006 | Baker | G06F 3/0362 345/173 |
| 2006/0085767 A1 * | 4/2006 | Hinckley | G06F 3/04842 715/863 |
| 2006/0094502 A1 * | 5/2006 | Katayama | A63F 13/10 463/31 |
| 2006/0232611 A1 * | 10/2006 | Brooke | G06F 3/0481 345/671 |
| 2007/0024593 A1 * | 2/2007 | Schroeder | G06F 3/0421 345/173 |
| 2007/0080936 A1 * | 4/2007 | Tsuk | G06F 1/1626 345/156 |
| 2007/0097086 A1 * | 5/2007 | Battles | G06F 3/03547 345/173 |
| 2007/0130547 A1 * | 6/2007 | Boillot | G06F 3/017 715/863 |
| 2007/0279394 A1 * | 12/2007 | Lampell | A63F 13/00 345/173 |
| 2007/0284154 A1 | 12/2007 | Li et al. | |
| 2008/0005703 A1 * | 1/2008 | Radivojevic | G06F 1/1626 715/863 |
| 2008/0062151 A1 * | 3/2008 | Kent | G06F 3/0418 345/177 |
| 2008/0134078 A1 * | 6/2008 | Han | G06F 3/04883 715/784 |
| 2008/0136754 A1 * | 6/2008 | Tsuzaki | G06F 3/04883 345/84 |
| 2009/0122007 A1 * | 5/2009 | Tsuzaki | G06F 3/0412 345/156 |

FOREIGN PATENT DOCUMENTS

| | | |
|---|---|---|
| JP | 1985-136891 A | 7/1985 |
| JP | H11-219432 A | 8/1999 |
| JP | 2003-092607 A | 3/2003 |

OTHER PUBLICATIONS

International Search Report w/translation from PCT/EP2008/068025 dated Apr. 15, 2009 (6 pages).

* cited by examiner

|   | 0  | 1  | 2  | 3 | 4 | 5 | 6 |
|---|----|----|----|---|---|---|---|
| 0 | -1 | -1 | -1 | 0 | 0 | 0 | 0 |
| 1 | -1 | -1 | 2  | 2 | 1 | 1 | 1 |
| 2 | -1 | 5  | 4  | 3 | 2 | 2 | 2 |
| 3 | 7  | 5  | 4  | 4 | 3 | 2 | 2 |
| 4 | 7  | 6  | 5  | 4 | 4 | 3 | 3 |
| 5 | 7  | 6  | 5  | 5 | 4 | 4 | 4 |
| 6 | 7  | 6  | 6  | 5 | 4 | 4 | 4 |

Xu

Yu

METHOD FOR DETECTING AN ANGULAR VARIATION OF A CONTROL PATH ON A TOUCH SURFACE AND CORRESPONDING CONTROL MODULE

The present invention relates to a method for determining an elementary angle of a control trajectory on a touch surface as well as to a method for detecting an angular variation on a touch surface.

The invention also relates to a corresponding touch-surface control module using, in particular, pressure sensitive resistors (also known by the name FSR sensor standing for "Force Sensing Resistor").

The invention applies more particularly to the control of an electrical or electronic member of a motor vehicle such as the control of a multimedia screen or of an air-conditioning system.

It has been proposed, more recently, that touch surfaces be used for these controls, making it possible to detect a simple press of a user's finger so as to trigger a particular type of action or control as a function of the position of the detected press and/or of the subsequent displacement of this press on the surface.

These touch surfaces are increasingly using the technology of pressure sensitive resistors, which are outpacing other equivalent technologies, such as for example capacitive or else optical technologies, by virtue of its ease of implementation and its robustness.

Such sensors are for example known by the name "digitizer pad" and the following documents are cited as prior art: U.S. Pat. No. 4,810,992, U.S. Pat. No. 5,008,497, FR 2683649 or else EP 0 541 102.

These sensors comprise semi-conducting layers sandwiched between for example a conducting layer and a resistive layer. By exerting a pressure on the FSR layer, its ohmic resistance decreases, thus making it possible, by applying a suitable voltage, to measure the pressure applied and/or the location of the place where the pressure is exerted.

The coordinates delivered by the sensor are thereafter utilized for the control of an electrical specific function associated with the zone touched by the user's finger.

In certain cases where one wishes to detect a particular trajectory of the user's finger, such as for example a circular control trajectory, touch surfaces whose shape guides the finger are in particular provided. For example, ring-shaped touch-surface sensors or ones shaped in the form of circular arc bands or else in the form of rectilinear bands are known.

Moreover, when the touch surface exhibits an arbitrary shape, other control modules comprising processing units implementing algorithms for calculating the angular variation of the trajectory of a control finger are known.

These calculations are in particular carried out on the basis of the information regarding the displacements traveled by the control finger and through the use of trigonometric functions such as the "arc tangent" function.

However, these functions require considerable memory capacity and give rise to hefty calculation times, that are often incompatible with the constraints related to the automobile industry.

Indeed, cost and bulkiness specifications require the use of small microcontrollers of low capacity that may be for example, integrated into the front console of a vehicle so as to control the electronic or electrical members of the vehicle.

The aim of the present invention is therefore to propose a detection method and a touch-surface control module making it possible to determine the angular variation of a trajectory of a control suitably adapted for microcontrollers of small capacity and low cost.

For this purpose, the subject of the invention is a method for determining an elementary angle of a control trajectory on a touch surface characterized in that:
 two values of elementary displacements are measured along two perpendicular axes in the course of a predetermined duration,
 said values are compared with spans of unit values of elementary displacements of a reference data table and,
 a reference datum representative of an angle is ascribed to an elementary angle of the control trajectory.

According to other characteristics of the method for determining an elementary angle of a control trajectory on a touch surface,
 the reference datum representative of an angle is an integer number or a character,
 an intermediate elementary angle is firstly determined, on the basis of which is thereafter determined the elementary angle of the control trajectory relating to an axis, in accordance with the sense of orientation of each elementary displacement,
 said reference datum is representative of a zero angle when the sum of the two values of elementary displacements is less than a predetermined threshold,
 an elementary displacement value along an axis is divided by an integer number if the value of said displacement is greater than the unit value of maximum elementary displacement along this axis in the reference data table.

The subject of the invention is also a method for detecting an angular variation of a control trajectory on a touch surface characterized in that:
 the method for determining an elementary angle of a control trajectory such as previously described is carried out and the elementary angle ascribed in the course of an elementary step is stored,
 the elementary step is repeated and the ascribed elementary angles are successively assembled so as to determine an angular variation of the control trajectory.

According to other characteristics of the method for detecting an angular variation of a control trajectory on a touch surface,
 the control trajectory is compared with a reference control trajectory library so as to retain a control trajectory exhibiting a significant shape corresponding to a predefined shape criterion,
 the shape of the control trajectory is determined on the basis of the difference of at least two successive elementary angles,
 a direction of rotation of the control trajectory is determined on the basis of the difference of at least two successive elementary angles,
 the direction of rotation and the elementary angle are compared with an additional reference data table so as to ascribe to the control trajectory a position on a touch surface exhibiting the shape of a ring,
 a revolution counter is incremented when the control trajectory is greater than 360°.

The subject of the invention is furthermore a control module comprising a touch surface characterized in that it comprises a processing unit for the implementation of a method for detecting an angular variation of a control trajectory such as previously described.

According to other characteristics of the control module,
 the control module comprises a display screen connected to the processing unit, able to display a control trajectory, the control module is able to control the functions of at least one set of electrical or electronic members of a motor vehicle, such as an air-conditioning system, an audio system, a navigation system, a telephone system, motorized window winder controls, controls for adjusting exterior rear-view mirrors, controls for adjusting the position of a sunroof, controls for interior lighting, controls for adjusting a motor vehicle seat.

Figures 2, 3:
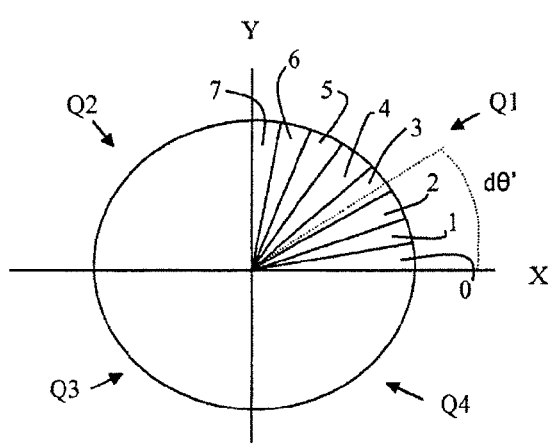
Figure 4:
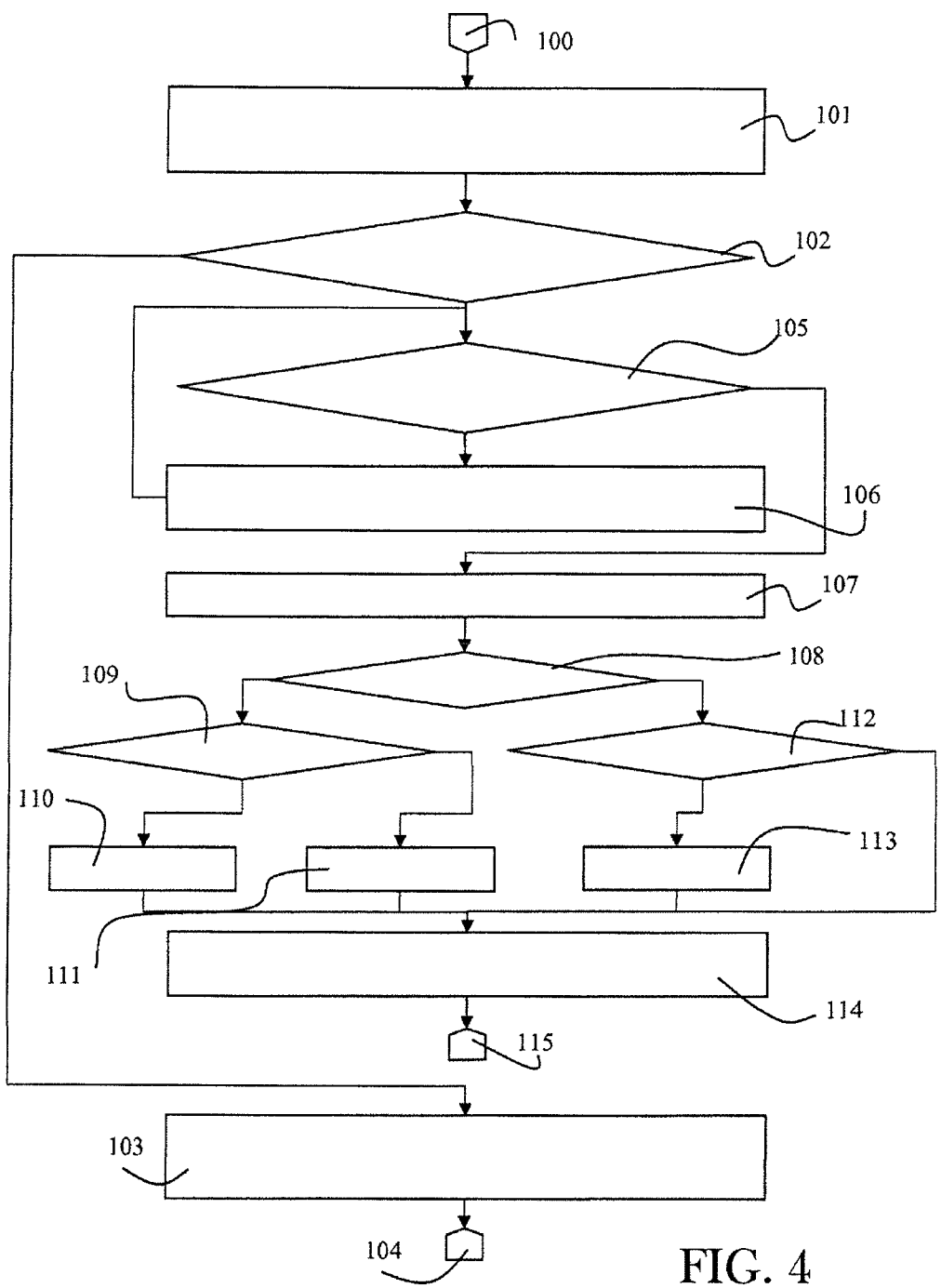
Figure 5:
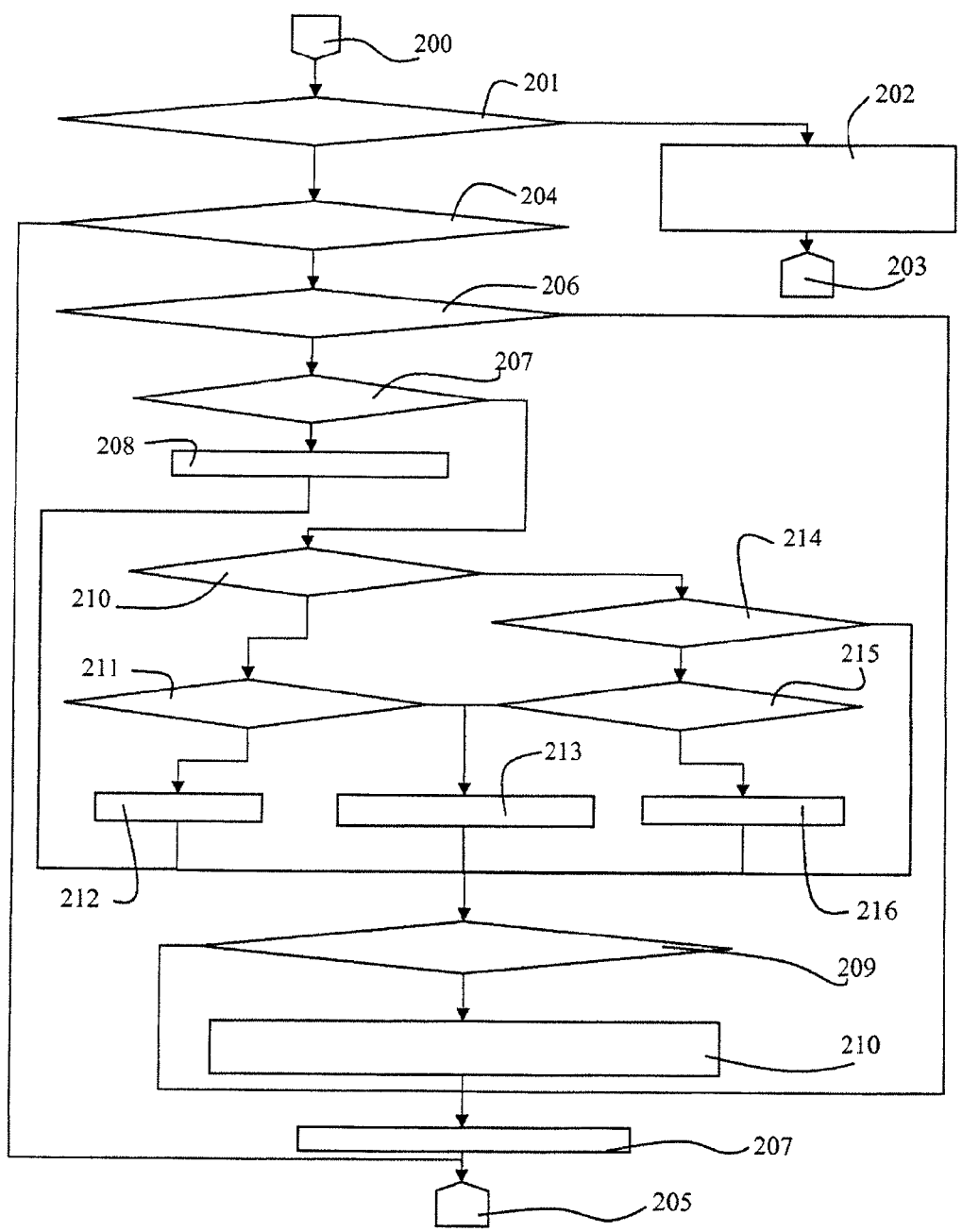

Other advantages and characteristics will become apparent on reading the description of the invention, as well as the appended drawings in which:

FIG. 1 is a schematic view of a touch surface on which various shapes of control trajectories have been represented, FIG. 2 represents a reference data table, FIG. 3 illustrates an exemplary intermediate elementary angle, FIG. 4 is a flowchart showing the various steps of an exemplary method for determining an elementary angle and, FIG. 5 is a flowchart showing the various steps of an exemplary method for detecting an angular variation of a control trajectory.

In these figures, identical elements bear the same reference numbers. For the sake of clarity, the steps of the method for determining an elementary angle are numbered from 100 and the steps of the method for detecting an angular variation of a control trajectory are numbered from 200.

FIG. 1 represents a touch surface 1, in particular intended to be integrated into an electrical control module, so as for example to control the functions of at least one set of electrical or electronic members of a motor vehicle, such as an air-conditioning system, an audio system, a navigation system, a telephone system, motorized window winder controls, controls for adjusting exterior rear-view mirrors, controls for adjusting the position of a sunroof, controls for interior lighting or controls for adjusting a motor vehicle seat.

The touch surface 1 uses for example sensors of pressure sensitive resistors (also known by the name FSR sensor standing for "Force Sensing Resistor") and, is able to provide a signal to a control module processing unit, corresponding to a zone of pressing of a user's finger applied to the touch surface 1.

A pressing zone corresponds to a pressure applied by a control finger for example by modifying the ohmic resistance of the pressure sensitive resistor sensor of the touch surface 1.

Through the application of a suitable voltage, the processing unit measures the signal corresponding to the pressure applied and/or the location of the place where the pressure is exerted on the touch surface 1.

The processing unit of the control module, such as a microcontroller, for example of 8-bit type, comprises a program memory, for the implementation of software able to execute a method for detecting an angular variation of a control trajectory.

Four examples of control trajectories have been represented in FIG. 1, of which a first exhibits the shape of a straight line a, a second exhibits the shape of an ellipse b, a third exhibits the shape of a spiral c and a fourth exhibits an arbitrary shape d.

The control module can comprise a display screen connected to the processing unit which is able to display a control trajectory such as represented in FIG. 1.

The method for determining the elementary angle of the control trajectory on the touch surface 1 comprises a first step in which two values of elementary displacements |dX|, |dY| are measured along two perpendicular axes X, Y in the course of a predetermined duration dT.

The predetermined duration dT is preferably a clock period of the processing unit, for example of the order of 10 msec.

The values of the elementary displacements |dX| and |dY| represent the projection along the two perpendicular axes X and Y, of an elementary displacement of the control trajectory on the touch surface 1, in the course of the predetermined duration dT. FIG. 1 illustrates an example of the displacement AB and projections |dX|, |dY| along the axes X and Y.

Next, said values |dX|, |dY| are compared with spans of unit values of elementary displacements Xu and Yu of a reference data table (FIG. 2). In the example of FIG. 2, these spans of unit values Xu, Yu are shown diagrammatically by integers ranging from 0 to 6 for each of the two perpendicular axes X and Y.

By way of example, a span of unit value of elementary displacement Xu and/or Yu is of the order of 2 mm, this being sufficient for the detection of the motion of a finger on the touch surface.

For each pair of span of unit value of elementary displacement Xu, Yu, the table provides a corresponding reference datum, representative of an angle.

The result of this comparison thereafter makes it possible to ascribe a reference datum representative of an angle to an elementary angle dθ of the control trajectory.

Thus, the method uses a table of pre-input reference data to partially emulate the trigonometric functions making it possible to obtain rapidly and without calculation an information cue regarding the elementary angle dθ of the control trajectory.

Preferably, the reference datum is an integer number or a character, thereby making it possible not to use decimal numbers which consume a great deal of memory capacity. In the table of FIG. 2, a positive or negative integer number (−1, 0, 1, 2, 3, 4, 5, 6) has been ascribed as reference datum representative of an angle.

Advantageously, the method of determination comprises an additional step in which an intermediate elementary angle dθ' (FIG. 3) is firstly determined, on the basis of which is thereafter determined the elementary angle dθ of the control trajectory relating to an axis X, in accordance with the sense of orientation of each elementary displacement dX, dY.

Preferably, an intermediate elementary angle dθ' is firstly determined over a quarter circle Q1 and then it is determined whether the elementary angle dθ of the trajectory is realized from 0 to 90° over the first quarter circle Q1, from 90° to 180° over the second quarter circle Q2, from 180° to 270° over the third quarter circle Q3 or from 270° to 360° over the fourth quarter circle Q4.

Thus, if the two elementary displacements dX and dY are oriented in the same sense as the two axes X and Y, then the elementary angle dθ lies in the first quarter circle Q1, i.e. between 0 and 90°. The elementary angle dθ is therefore equal to the intermediate elementary angle dθ'.

On the other hand, if the elementary displacement dX along a first axis X is oriented in the same sense as this axis X but the elementary displacement dY along the second axis Y is oriented in the opposite sense to the latter, then the elementary angle dθ lies in the fourth quarter circle Q4, stated otherwise between 0° and −90° or else between 270° to 360°. The elementary angle dθ is therefore equal to the negative of the intermediate elementary angle dθ'.

Also, if the elementary displacement dX is oriented in the opposite sense to the axis X but the elementary displacement dY is oriented in the same sense as the latter, then the elementary angle dθ lies in the second quarter circle Q2, stated otherwise between 90° and 180°. The elementary angle dθ is therefore equal to the difference between 180° and the intermediate elementary angle dθ'.

Finally, if the elementary displacements dX and dY are oriented in the opposite sense from the senses of the axes X and Y, then the elementary angle dθ lies in the third quarter circle Q3, that is to say between 180° and 270°. The elementary angle dθ is therefore equal to the sum of 180° and of the intermediate elementary angle dθ'.

By virtue of this angle slicing for the calculation of the elementary angle dθ, the size of the reference data table is decreased. Indeed, it suffices to have the values representative of the angles over a portion of circle Q1 so as to be able to determine an angle over a complete circle. The size of the reference data table thus depends on the resolution desired for the elementary angle dθ.

In the example illustrated in FIG. 2, the table thus comprises data representative of an angle lying between 0 and 90°. The quarter circle Q1 is divided into sectors to which a datum representative of the angle of the sector has been ascribed. Thus, the first quarter circle Q1 is divided into 8 sectors for an angular resolution of 11.25° (see FIG. 3).

Advantageously, the reference datum is representative of a zero angle when the sum of the two values of elementary displacements |dX|, |dY| is less than a predetermined threshold.

In the table of FIG. 2, the negative number −1 is representative of a zero angle. In this example, it is in fact considered that the elementary trajectory angle dθ is zero for a displacement the sum of whose two values of elementary displacements |dX|, |dY| is less than or equal to 2 mm.

Preferably, an elementary displacement value |dX|, |dY| along an axis X, Y is divided by an integer number, preferably by two, if the value of the displacement |dX|, |dY| is greater than the unit value of maximum elementary displacement |Xu|, |Yu| along this axis X, Y in the reference data table.

Thus, the size of the reference data table is limited and, furthermore, it is possible to circumvent aberrant displacement values.

In order to determine an angular variation of a control trajectory, an angular variation detection method comprises an elementary step in the course of which the method for determining an elementary angle of a control trajectory such as previously described is carried out and the ascribed elementary angle dθ is stored.

Next, the elementary step is repeated and the ascribed elementary angles dθ are successively assembled so as to determine an angular variation of the control trajectory.

It is then possible to identify the shape of the control trajectory.

For example, the control trajectory is compared with a reference control trajectory library so as to retain a control trajectory exhibiting a significant shape corresponding to a predefined shape criterion.

Alternatively, the shape of the control trajectory is determined on the basis of the difference of at least two successive elementary angles dθ, with respect to an axis X, Y.

In the case where a substantially circular form of the control trajectory has been determined, it is furthermore possible to determine the direction of rotation of the trajectory on the basis of the difference of at least two successive elementary angles de with respect to an axis X, Y.

In an advantageous manner, the direction of rotation and the elementary angle are compared with an additional reference data table so as to ascribe to the control trajectory a position on a touch surface exhibiting the shape of a ring.

Thus, the knowledge of the position of the center of the substantially circular motion traveled by the finger of the user is circumvented, the latter being able furthermore to vary if for example the control trajectory exhibits the shape of an ellipse.

It is furthermore possible to increment a revolution counter for each angular variation of the control trajectory greater than 360°.

FIG. 4 illustrates the various steps of an exemplary method for determining the elementary angle.

Thus, when implementing the method, one begins by measuring the coordinates X0 and Y0 of a first press A on a touch surface 1, in the course of an initialization phase 100.

After a predetermined duration dT, the new coordinates X1 and Y1 of a second press B on the touch surface 1 are measured, and then the two values of elementary displacements |dX| and |dY| are determined (step 101).

Thereafter, in step 102, a check is performed to verify whether the sum of the two elementary displacements |dX|, |dY| is greater than a predetermined threshold.

If the sum of the two elementary displacements |dX|, |dY| is less than or equal to the predetermined threshold, then a reference datum representative of a zero angle is ascribed to the elementary angle dθ (step 103) and the method for determining the elementary angle of the control trajectory ends (step 104).

If conversely, the sum of the two elementary displacements |dX|, |dY| is greater than the predetermined threshold, then it is deemed to be possible to determine the elementary angle dθ with sufficient accuracy.

In the latter case, it is then determined whether one of the two (or both) values of elementary displacements |dX|, |dY| are greater than the maximum unit values of elementary displacement |Xu|, |Yu| of the reference data table (lozenge 105).

If such is the case, then the value of the elementary displacement |dX|, |dY| is divided for example by two, (step 106) until an elementary displacement value |dX|, |dY| is determined that is less than the maximum unit value Xu, Yu of the table.

Thereafter, in step 107, when the elementary displacement value |dX|, |dY| is compatible with the elementary unit displacement values |Xu|, |Yu|, these values are compared with the spans of unit values of elementary displacements Xu, Yu of the table and a reference datum representative of an angle is ascribed to the intermediate elementary angle dθ' of the control trajectory.

Thereafter, the elementary angle dθ of the control trajectory relating to an axis X, Y in accordance with the sense of orientation of each elementary displacement dX, dY is determined.

For this purpose, it is determined whether the elementary displacement dX along the first axis X is in the opposite sense to the axis X (lozenge 108).

If it is, it is then determined whether the elementary displacement dY along the second axis Y is in the sense opposite to this axis Y (lozenge 109).

If such is the case, then the elementary angle dθ is equal to 180° added to the intermediate elementary angle dθ in the course of step 110.

If the elementary displacement dY is in the same sense as the axis Y then the elementary angle dθ is equal to 180° from which is subtracted the intermediate elementary angle dθ' in the course of step 111.

If on the other hand, the elementary displacement dX along the first axis X is in the same sense as the axis X and if the elementary displacement dY along the second axis Y is in the sense opposite to this axis Y then the sign of the intermediate angle dθ is reversed in the course of step 113.

If finally the elementary displacements dX, dY are in the same sense as the two axes X and Y, then we pass to the following step 114 while ascribing dθ' to dθ.

Next, the elementary angle dθ determined is stored, the values of the coordinates Y1, X1 of the second press B are assigned to the coordinates of the first press X0, Y0 and the method is terminated at step 104.

Advantageously, this elementary step is repeated and the ascribed elementary angles dθ are successively assembled so as to determine an angular variation of the control trajectory.

FIG. 5 illustrates the various steps of a particular embodiment of the method for detecting an angular variation for which it has been determined that the control trajectory possesses a substantially circular shape or for which the touch surface exhibits a substantially circular shape, such as a ring.

The method comprises a first initialization phase 200 in the course of which the value of the previous elementary angle dθ is initialized.

Next, in the course of step 201, it is determined whether a displacement is carried out on the touch surface. If no displacement is observed, the value of previous elementary angle dθ is reinitialized in the course of step 202 and the method is terminated at step 203.

Otherwise, in the course of the elementary step 204, the method for determining an elementary angle dθ of a control trajectory is carried out and the ascribed elementary angle dθ is stored.

If the elementary angle dθ is zero, then the method is terminated at step 205.

Otherwise, in the case where the previous elementary angle dθ is zero (step 206), the elementary angle dθ is ascribed to the previous elementary angle dθ in step 207 and the method is terminated (step 205).

Otherwise, the difference between the two successive elementary angles dθ is calculated and it is determined whether this difference is equal to 180° (step 207). If such is the case, then it has been determined that the control trajectory has performed a complete half-revolution (step 208) and we then go to step 209.

Otherwise, the sign of the difference between the two successive elementary angles dθ is determined. If the sign is positive, then the elementary angle dθ is greater than the previous elementary angle dθ and the control trajectory rotates a priori in the trigonometric sense.

A check is thereafter performed (step 211) to verify whether in the course of the previous step, a trigonometric rotation had also been determined. If such was the case, then the trigonometric rotation direction is validated (step 212).

If such was not the case in the previous step of the method, then the direction of rotation is indeterminate (step 213) and we pass to the following step 209.

On the other hand, if the sign is negative, then the elementary angle dθ is less than the previous elementary angle dθ and the control trajectory rotates a priori clockwise (step 214).

A check is thus performed (step 215) to verify whether in the course of the previous step, there was also a clockwise rotation. If such was also the case, then the clockwise direction of rotation is validated (step 216).

If such was not the case in the previous step, then the direction of rotation is indeterminate (step 213) and we go to the following step 209.

In the case where the touch surface exhibits the shape of a ring and if the direction of rotation is not indeterminate in step 209, then the direction of rotation and the elementary angle dθ are compared with an additional reference data table so as to ascribe to the control trajectory a position on the touch surface (step 210).

Next, in step 207, the following elementary angular value dθ which has just been determined is ascribed to the previous elementary angular value dθ so as to reinitialize the value of the previous elementary angular value dθ and thus be able to repeat the method.

It is understood that such a detection method enables the position of the control finger on the touch surface to be determined rapidly and at lesser cost.

The invention claimed is:

1. A method for determining an elementary angle of a control trajectory on a touch surface, comprising:
    measuring two values of elementary displacements representative of projections along two perpendicular axes on a touch-surface control module in the course of a predetermined duration, the touch-surface control module being used to control the functions of at least one set of electrical or electronic members of a motor vehicle;
    comparing said two values of elementary displacements with spans of unit values of elementary displacements of a reference data table, wherein the reference data table comprises a plurality of reference data and provides pre-input data for associating the two values of the elementary displacements with the spans of unit values of elementary displacements; and
    ascribing each of the reference data to an elementary angle of the control trajectory,
    wherein each of the plurality of reference data corresponds to a range of angles,
    wherein each of the plurality of reference data is representative of a zero angle when a sum of the two values of elementary displacements is less than a predetermined threshold,
    wherein a revolution counter is incremented when the control trajectory is greater than 360°.

2. The method as claimed in claim 1, wherein each of the reference data is an integer number.

3. The method as claimed in claim 1, wherein an intermediate elementary angle is initially determined, and based on the intermediate elementary angle, the elementary angle of the control trajectory relating to an axis in accordance with the sense of orientation of each elementary displacement is determined.

4. The method as claimed in claim 1, wherein an elementary displacement value along an axis is divided by an integer number if the value of said displacement is greater than the unit value of maximum elementary displacement along the axis in the reference data table.

5. The method as claimed in claim 1, wherein each of the reference data is a character.

6. A method for detecting an angular variation of a control trajectory on a touch surface, comprising:
    measuring two values of elementary displacements representative of projections along two perpendicular axes on a touch-surface control module in the course of a predetermined duration, the touch-surface control module being used to control the functions of at least one set of electrical or electronic members of a motor vehicle;

comparing said two values of elementary displacements with spans of unit values of elementary displacements of a reference data table, wherein the reference data table comprises a plurality of reference data and provides pre-input data for associating the two values of the elementary displacements with the spans of unit values of elementary displacements; and ascribing each of the reference data to an elementary angle of the control trajectory;

storing the elementary angle ascribed in the course of an elementary step; and repeating the elementary step and successively assembling the ascribed elementary angles to determine an angular variation of the control trajectory, wherein each of the plurality of reference data corresponds to a range of angles, wherein each of the plurality of reference data is representative of a zero angle when a sum of the two values of elementary displacements is less than a predetermined threshold, and wherein a revolution counter is incremented when the control trajectory is greater than 360°.

7. The detection method as claimed in claim 6, wherein the control trajectory is compared with a reference control trajectory library so as to retain a control trajectory exhibiting a significant shape corresponding to a predefined shape criterion.

8. The detection method as claimed in claim 6, wherein the shape of the control trajectory is determined on the basis of a difference of at least two successive elementary angles.

9. The method as claimed in claim 6, wherein each of the reference data is an integer number.

10. The method as claimed in claim 6, wherein each of the reference data is a character.

11. The detection method as claimed in claim 6, wherein a direction of rotation of the control trajectory is determined on the basis of a difference of at least two successive elementary angles.

12. The detection method as claimed in claim 11, wherein the direction of rotation and the elementary angle are compared with an additional reference data table so as to ascribe to the control trajectory a position on a touch surface exhibiting the shape of a ring.

13. A control module comprising a touch surface, comprising a processing unit for implementation of a method for detecting an angular variation of a control trajectory, the method comprising:

measuring two values of elementary displacements representative of projections along two perpendicular axes on a touch-surface control module in the course of a predetermined duration, the touch-surface control module being used to control the functions of at least one set of electrical or electronic members of a motor vehicle;

comparing said two values of elementary displacements with spans of unit values of elementary displacements of a reference data table, wherein the reference data table comprises a plurality of reference data and provides pre-input data for associating the two values of the elementary displacements with the spans of unit values of elementary displacements; and ascribing each of the reference data to an elementary angle of the control trajectory;

storing the elementary angle ascribed in the course of an elementary step; and repeating the elementary step and successively assembling the ascribed elementary angles to determine an angular variation of the control trajectory, wherein each of the plurality of reference data corresponds to a range of angles, wherein each of the plurality of reference data is representative of a zero angle when a sum of the two values of elementary displacements is less than a predetermined threshold, and wherein a revolution counter is incremented when the control trajectory is greater than 360°.

14. The control module as claimed in claim 13, wherein each of the reference data is an integer number.

15. The control module as claimed in claim 13, each of the reference data is a character.

16. The control module as claimed in claim 13, further comprising a display screen connected to the processing unit, able to display a control trajectory.

17. The control module as claimed in claim 16, wherein the control module is configured to control the functions of at least one set of electrical or electronic members of a motor vehicle.

18. The control module as claimed in claim 17, wherein the at least one set of electrical or electronic members of a motor vehicle comprise at least one selected from a group consisting of an air-conditioning system, an audio system, a navigation system, a telephone system, motorized window winder controls, controls for adjusting exterior rear-view mirrors, controls for adjusting the position of a sunroof, controls for interior lighting, controls for adjusting a motor vehicle seat.

* * * * *